United States Patent
Grubb

(10) Patent No.: US 8,224,549 B2
(45) Date of Patent: Jul. 17, 2012

(54) METHOD AND SYSTEM FOR CONTROLLING VEHICLE FUNCTIONS IN RESPONSE TO AT LEAST ONE OF GRADE, TRAILERING, AND HEAVY LOAD

(75) Inventor: Glenn A. Grubb, Kalamazoo, MI (US)

(73) Assignee: GM Global Technology Operations LLC

(*) Notice: Subject to any disclaimer, the term of this patent is extended or adjusted under 35 U.S.C. 154(b) by 398 days.

(21) Appl. No.: 12/561,720

(22) Filed: Sep. 17, 2009

(65) Prior Publication Data

US 2011/0066348 A1    Mar. 17, 2011

(51) Int. Cl.
*G06F 17/00* (2006.01)
*G06F 19/00* (2006.01)

(52) U.S. Cl. .................. 701/82; 701/69; 701/70

(58) Field of Classification Search ............. 701/82, 701/70, 51, 87, 65, 69, 84; 477/120
See application file for complete search history.

(56) References Cited

U.S. PATENT DOCUMENTS

| | | | |
|---|---|---|---|
| 5,531,654 A | 7/1996 | Ishikawa et al. | |
| 5,813,942 A * | 9/1998 | Nakagawa et al. | 477/120 |
| 5,890,993 A | 4/1999 | Horiguchi et al. | |
| 6,701,224 B1 * | 3/2004 | Klusemann | 701/1 |
| 2005/0085950 A1 * | 4/2005 | Altenkirch | 701/1 |
| 2006/0136111 A1 * | 6/2006 | Robert et al. | 701/65 |
| 2007/0129871 A1 * | 6/2007 | Post et al. | 701/69 |
| 2008/0015778 A1 * | 1/2008 | Matsuura et al. | 701/301 |
| 2008/0120006 A1 * | 5/2008 | Hommi et al. | 701/84 |

FOREIGN PATENT DOCUMENTS

DE    10026102 A1    2/2001

OTHER PUBLICATIONS

German Office Action for DE102010045304.8 dated Jan. 31, 2011; 3 pages.

* cited by examiner

*Primary Examiner* — Tan Q Nguyen

(57) ABSTRACT

A control module and method for controlling vehicle systems, including a possible acceleration module determining possible vehicle acceleration, an actual acceleration module determining actual vehicle acceleration, and a vehicle system control module controlling or providing input to the vehicle systems in response to the difference between possible vehicle acceleration and actual vehicle acceleration.

20 Claims, 2 Drawing Sheets

METHOD AND SYSTEM FOR CONTROLLING VEHICLE FUNCTIONS IN RESPONSE TO AT LEAST ONE OF GRADE, TRAILERING, AND HEAVY LOAD

FIELD

The present disclosure relates to a system for controlling vehicle functions to compensate for operating a vehicle having at least one of the following conditions: on a grade (hill); with a trailer; and with a load such as cargo, occupants, or luggage.

BACKGROUND

The background description provided herein is for the purpose of generally presenting the context of the disclosure. Work of the presently-named inventors, to the extent it is described in this background section, as well as aspects of the description that may not otherwise qualify as prior art at the time of filing, are neither expressly nor impliedly admitted as prior art against the present disclosure.

Vehicles that are used for trailering or carrying heavy loads normally have systems that are sized to handle extended heavy usage. In the past, trucks sold for extended heavy usage have sometimes used detuned engines to limit peak torques based upon the anticipated extended heavy usage. The detuned modes ran regardless of the grade or trailering condition for which a particular vehicle was being used.

Many current vehicles have high specific output for quick performance and are also used periodically for trailering or carrying heavy loads.

Some current vehicles use a trailer mode switch to change the transmission shift patterns. The switch is manually operated by the driver. When the driver uses the switch properly, the vehicle please-ability and functionality of systems (such as cooling) are enhanced. Also, in some applications, the electronic throttle controls accelerator response in a manner to yield proper reserve acceleration. This is another technique to enhance vehicle please-ability. Some applications also use shift stabilization, which prevents gears from changing repeatedly during operation on a grade, with trailering, and/or a heavy load. This is yet another technique to enhance vehicle please-ability.

Several of the above-mentioned techniques enhance vehicle please-ability; however, in addition, vehicle systems are sized to handle heavy usage and the extended heavy usage that occurs with grade, trailering, and/or heavy loading. Grade, trailering and/or a heavy load impose an "extra load" that can be compensated for in terms of the vehicles "life used" during the design life of the vehicle.

SUMMARY

Accordingly, the present disclosure provides an "automatic" technique for sensing whether the vehicle is operating on a grade, with trailering, and/or with heavy loading. The system monitors sensor information and adjusts vehicle systems to compensate for the heavy usage. The information obtained is used to "automatically" adjust system operation, provide please-able operation, provide proper system function, and it would be used for the torque management of systems that would allow minimizing system cost by sizing systems according to the amount of torque management and heavy usage. A constant headwind would affect vehicle performance in the same manner as grade, trailering, and/or a heavy load; however, the effect is minor relative to that of grade, trailering, and/or heavy loading. Adjustments due to the minor effect of headwind would also correctly adjust for its effect on vehicle performance.

In one aspect of the disclosure, a method includes determining possible vehicle deceleration and/or acceleration and actual vehicle deceleration and/or acceleration. The difference between the possible and the actual indicates that the vehicle is operating on a grade, with trailering, and/or with a heavy load; and the vehicle systems would be controlled accordingly. This method could also require detecting tire spin so as not to confuse slow movement due to tire spin with low acceleration.

In another aspect of the disclosure, a method includes use of a learning algorithm. Use of a learning algorithm is most suitable for the type of information that would be processed, but is not necessarily required. An optimum production system would be developed, tuned, and calibrated for the best system performance. Including information (in the control module) concerning spin losses, efficiencies, and part inertias is one of the techniques that would also provide the disclosure's maximum accuracy and capability Further areas of applicability of the present disclosure will become apparent from the detailed description provided hereinafter. It should be understood that the detailed description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
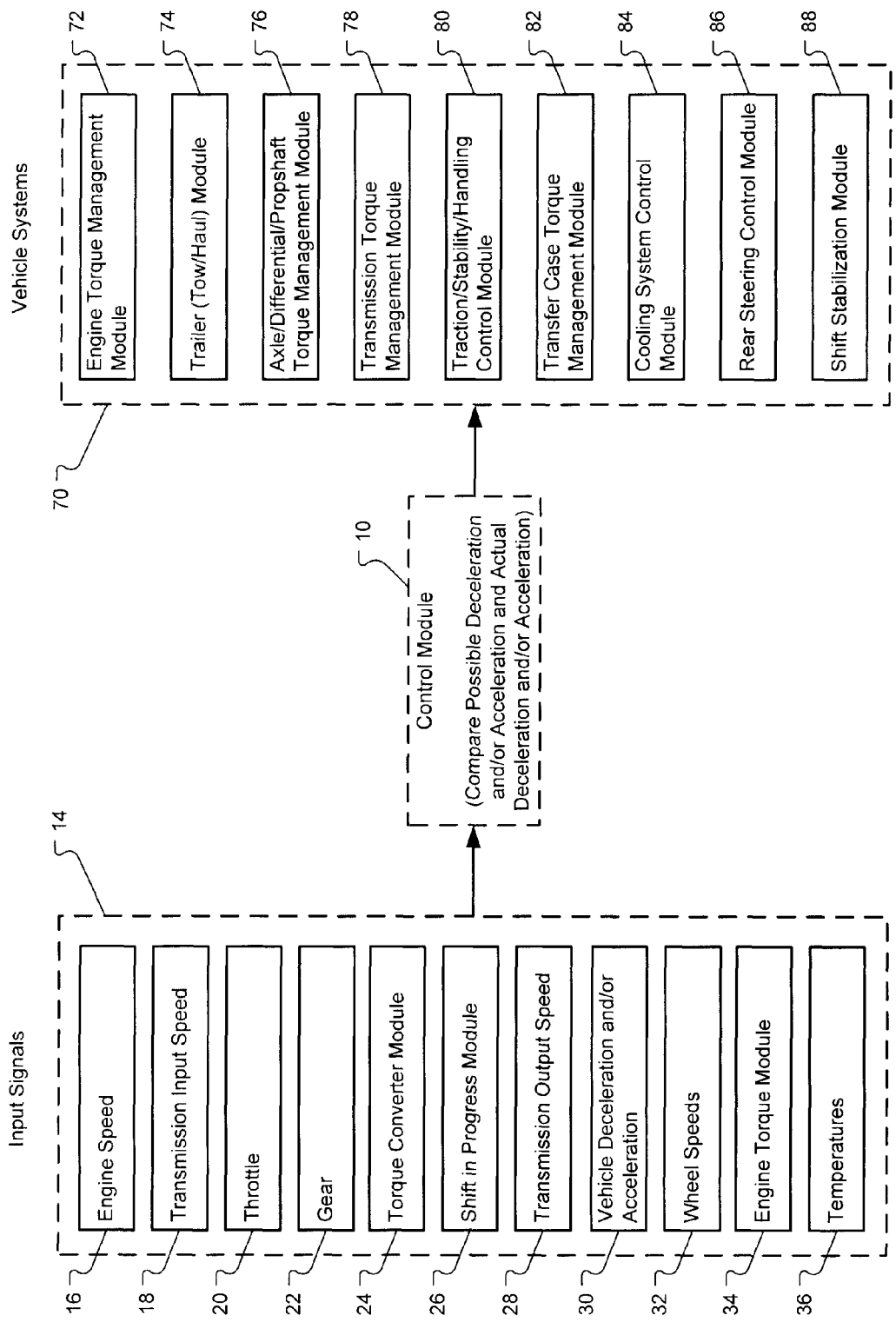
FIG. 1 is a diagrammatic view which details Input Signals and Vehicle Systems affected by the present disclosure.

The following description is merely exemplary in nature and is in no way intended to limit the disclosure, its application, or uses. For purposes of clarity, the same reference numbers will be used in the drawings to identify elements.

As used herein, the phrase "at least one of A, B, and C" should be construed to mean a logical (A or B or C) using a non-exclusive logical, or it should be understood that steps within a method may be executed in different order without altering the principles of the present disclosure.

Also, input signals derived in various ways can accomplish the needed functionality, and vehicle systems can be controlled in various manners. The system described may refer to an automatic transmission with a torque converter; however, the present disclosure is just as applicable for other types of transmissions or hybrid drive systems, and does not require a torque converter.

As used herein, the term "module" refers to an application specific integrated circuit ("ASIC"), an electronic circuit, a processor (shared, dedicated, or group) and memory that execute one or more software or firmware programs, a combinational logic circuit, and/or other suitable components that provide the described functionality. As used herein, the term "module" may also refer to a subroutine within a controller, a function that is related to vehicle system operation, or an existing or new input or system control routine. The term "module" may also refer to a function accomplished by a routine, or to a hardware device. For instance, the term "module" may refer to an engine torque model, torque management technique, cooling system routine, cooling system device, rear steering hardware device or control system, etc.

The term "acceleration" may also refer to deceleration, which is negative acceleration in the vector sense.

Referring now to FIG. 1, the inputs 14 are illustrated. The inputs provide the data that is used for making decisions. The inputs may be from various sensors located throughout the vehicle, provided by other modules, or derived from information that is found within the same module.

The engine speed sensor 16 generates an engine speed signal corresponding to the rotational speed of the engine. The rotational speed of the engine may be derived from a crankshaft position sensor or the like.

The transmission input speed sensor 18 generates a transmission speed signal corresponding to the rotational speed of the transmission input. The sensor 18 may be located inside or outside the transmission. The transmission input speed is normally taken to be the rotational speed after the torque converter and before the mechanical (gearbox) portion of a transmission equipped with a torque converter.

A throttle signal 20 corresponds to the position of the throttle plate within a throttle body attached to the engine of a gasoline powered vehicle. However, for diesel powered vehicles, accelerator response is accomplished by an electronic value controlling the amount of fuel delivered. The electronic value is sometimes taken to be the "throttle" value in the control system. For a gasoline or diesel powered vehicle the throttle plate position, electronic value or a modified value may be used.

A gear signal 22 corresponds to the gear in which the transmission is operating. It may be obtained, for instance, by reading the gear state which is commanded by a transmission control module.

The torque converter module 24 supplies a value for torque converter multiplication. Torque converter module 24 uses various signals (typically 34, 16, and 18) and finds the amount of torque multiplication that the torque converter is providing. This disclosure does not require the use of a torque converter equipped transmission.

A shift in progress module 26 indicates that a transmission shift is in progress. If not available (by being detected in an existing module), it may be found by monitoring the change in the commanded gear state and adjusting for hydraulic and mechanical delays during the transmission shift.

Transmission output speed 28 is a speed signal corresponding to the transmission output speed (often propshaft speed).

A vehicle deceleration and/or acceleration 30 corresponding to the longitudinal deceleration and/or acceleration of the vehicle may be set forth via a signal from an accelerometer. The deceleration and/or acceleration signal may also be derived from vehicle speed, transmission output speed 28, wheel speeds 32, or other suitable signals.

A plurality of wheel speed sensors 32 find wheel speeds for each or most of the wheels/tires.

The engine torque module 34 supplies a value for engine torque. It uses various input signals (not listed here) to determine the output torque of the engine.

Temperatures are obtained from the appropriate temperature sensor 36. Drivelines (engine, transmission, differential, etc.) perform according to their temperature. Monitoring temperatures will allow best accuracy for characterizing spin losses, efficiencies, etc.

The control module 10 interprets the input signals 14 and provides input to the vehicle systems 70. The control module 10 is shown in further detail in FIG. 2.

The engine torque management module 72 is used to limit the amount of torque that is supplied. The engine torque is managed by the engine torque management module 72 according to the data it receives, for instance, from a transmission control module or other modules. Engine torque is reduced to limit torque during certain circumstances.

The trailer (tow/haul) module 74 can send data and control signals to the transmission control module to request, for example, that a certain gear be selected. Trailer (tow/haul) mode may, for example, send information to the engine torque management module to request that the engine torque be managed during specific operating conditions according to grade, trailering, and/or heavy load.

The axle/differential/propshaft torque management module 76 sends data or control signals to the engine torque management module 72 to request that the engine torque be managed during specific operating conditions that influence the axle/differential/propshaft.

The transmission torque management module 78 sends data or control signals to the engine torque management module 72 to request that the engine torque be managed during specific operating conditions that influence the transmission. Torque may be automatically managed, for instance, during first gear operation during grade, trailering, and/or heavy load.

A vehicle stability system, such as a traction/stability/handling control module 80, may send data and control signals to the traction/stability/handling routines or devices to request that appropriate traction/stability/handling adjustments be made. The one or more of the stability functions may be provided by the stability system.

The transfer case torque management module 82 may send data or control signals to the engine torque management module 72 to request that the engine torque be managed during specific operating conditions that influence the transfer case.

The rear steering control module 86 may send data or control signals to the rear steering routine or device to request that the rear steering occur during grade, trailering, and/or heavy loading. One of the scenarios where rear steering is important is during trailering.

The cooling system control module 84 may send data or control signals to the engine torque management module 72 to request that the engine torque be managed during specific operating conditions that influence engine or transmission cooling. An auxiliary cooler or cooling system control device may be controlled in this manner. Also, data could be sent to the transmission control to request that a certain gear be selected.

The shift stabilization module 88 is used to prevent gears from changing repeatedly when the vehicle is operating on a grade, with trailering, and/or a heavy load.

Shift stabilization from shift stabilization module 88 may be accomplished by means other than those set forth in this disclosure. Shift stabilization is an example of controlling a vehicle system. The teachings set forth herein may allow advanced methods of enabling shift stabilization, or its availability may streamline computation. The need for shift stabilization is directly related to operation with grade, trailering, and/or heavy load.

Figure 2:
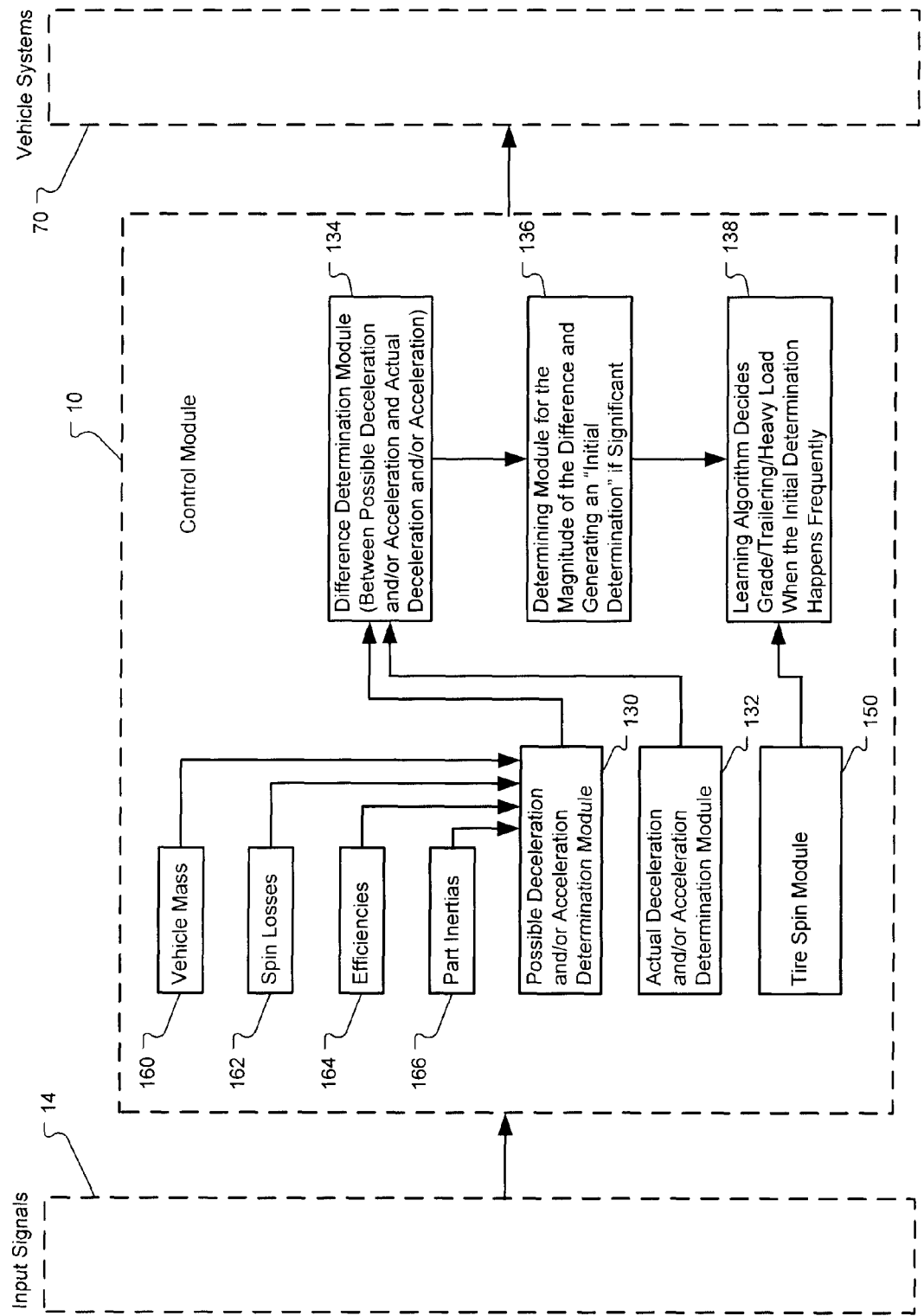
FIG. 2 is a diagrammatic view which details the Control Module of the present disclosure. The control module compares possible deceleration and/or acceleration and actual deceleration and/or acceleration.

Referring now to FIG. 2, the control module 10 is illustrated in further detail.

The possible deceleration and/or acceleration determination module 130 may be determined by using the information from the engine torque module 34. The engine torque creates the force that moves the vehicle. The force is relative to the vehicle mass 160, and deceleration and/or acceleration is the result. The possible deceleration and/or acceleration is determined in the module 130. The possible deceleration and/or acceleration is the deceleration and/or acceleration that would occur if the vehicle had no grade, trailering, and/or heavy load. The force that moves the vehicle can be determined from the engine torque, engine speed, throttle, gear, and the torque multiplication of the torque converter, if one is used. Spin loss 162, efficiencies 164, and part inertias 166 are known values that can be included to increase the accuracy of the determination of possible deceleration and/or acceleration. A comprehensive table of spin losses may be related to conditions such as speeds and temperatures, and use in the computation of the spin losses would increase the accuracy of the technique. Likewise, computation of the efficiencies and part inertias would also increase the accuracy.

Alternatively, the possible deceleration and/or acceleration may be determined by using tractive effort information. The tractive effort derivation is a state of the art technique that may be in place in the particular vehicle in which the disclosure is being used. Tractive effort information may be available in a routine such as traction/stability/handling control. Use of it when available and reliable could streamline the computational technique.

Actual deceleration and/or acceleration determination module 132 may determine an actual acceleration from an acceleration sensor, or it can be determined by evaluating the vehicle speed, transmission output speed, or other proportional signals. The actual deceleration and/or acceleration of the vehicle may be impeded (relative to the possible deceleration and/or acceleration) by grade, trailering, and/or heavy load, and, therefore, can be different from the possible deceleration and/or acceleration.

The possible deceleration and/or acceleration and actual deceleration and/or acceleration signal are provided to a difference determination module 134. Any difference would be relative to the amount of grade, trailering, and/or heavy load. The difference determination would be inactivated if the shift in progress module shows that a gear shift is occurring. A shift in progress would temporarily affect the apparent deceleration and/or acceleration on the vehicle.

The magnitude of the difference module 136 is evaluated and an initial determination may be generated if the magnitude of the difference is significant. This type of treatment is useful for input into the learning algorithm 138. Learning algorithms are appropriate when all signals generated are not 100% certain to be the absolutely correct value, but the accumulation gives the correct representation of the operation. If module 136 determines the magnitude of the difference to be significant an "initial determination" would be input to the learning algorithm. When the "initial determination" happens frequently the learning algorithm 138 would decide that the vehicle is experiencing grade, trailering, and/or heavy load. Evaluation of the significance of the magnitude of the difference, and use of a learning algorithm is useful but not required for the function of this disclosure; it could function without them.

It would be important to not mistake low deceleration and/or acceleration due to tire slip (such as on slippery pavement) for low deceleration and/or acceleration due to heavy load. By comparing front and rear wheel speeds the tire spin module 150, can determine tire slip or spin. If vehicle deceleration and/or acceleration is lower than possible, it could be due to operation with grade, trailering, and/or heavy load, or due to tire spin. The learning algorithm would not learn grade, trailering, and/or heavy load when tire spin is present. Comprehension of tire spin is not necessarily required for this disclosure; the use of the learning algorithm would allow some leeway in making the grade, trailering, and/or heavy load determination.

Also, various levels of grade, trailering, and/or heavy load could be determined. For example, a no change level, a low-level, mid-level or high-level may be used to control the various system functions. For instance, a low-level determination may require only certain components to adjust. Other components may adjust in a mid-level and more components may adjust in a high level. Also, the amount of adjustment may also be different for the different levels of determination.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   determining an estimated acceleration of a vehicle that is unloaded and that is not on a grade;
   determining an actual acceleration of the vehicle under actual trailerinq conditions, actual load carrying conditions, and actual grade conditions; and
   controlling a vehicle system in response to the estimated acceleration and the actual acceleration.

2. A method as recited in claim 1 wherein controlling the vehicle system comprises controlling the vehicle system in response to a difference between the estimated acceleration and the actual acceleration.

3. A method as recited in claim 1 wherein determining an actual acceleration comprises determining the actual acceleration from a vehicle accelerometer.

4. A method as recited in claim 3 further comprising:
   determining the actual acceleration based on a vehicle speed signal.

5. A method as recited in claim 3 further comprising:
   determining the actual acceleration from a signal that is proportional to vehicle speed.

6. A method as recited in claim 1 wherein determining a an estimated acceleration comprises determining the estimated acceleration from at least one of engine torque, engine speed, transmission speed, throttle position, transmission gear, torque converter multiplication, and vehicle speed.

7. A method as recited in claim 1 wherein determining an estimated acceleration comprises determining the estimated acceleration from a tractive effort.

8. A method as recited in claim 1 further comprising:
   determining tire spin.

9. A method as recited in claim 8 further comprising:
   in response to the estimated acceleration, the actual acceleration, and the tire spin, determining that at least one of the actual grade conditions are high, the vehicle is trailering a load, and that the vehicle is carrying a heavy load.

10. A method as recited in claim 1 further comprising:
    in response to the estimated acceleration and the actual acceleration, determining that at least one of the actual grade conditions are high, the vehicle is trailering a load, and that the vehicle is carrying a heavy load.

11. A method as recited in claim 1 wherein controlling a vehicle system comprises controlling at least one of an engine torque, transmission torque, axle torque, differential torque, propshaft torque, and transfer case torque.

12. A method as recited in claim 1 wherein controlling a vehicle system comprises controlling at least one of an engine system, a transmission system, a traction control system, a stability control system, a handling control system, a shift stabilization system, a cooling control system, and a rear steering control system.

13. A control module comprising:
- a possible acceleration module determining an estimated acceleration of a vehicle that is unloaded and that is not on a grade;
- an actual acceleration determination module determining an actual acceleration of the vehicle under actual grade conditions, actual trailering conditions, and actual load carrying conditions; and
- a vehicle system control module controlling a vehicle system in response to the estimated acceleration and the actual acceleration.

14. A control module as recited in claim 13 further comprising:
- a difference module determining a difference between the estimated acceleration and the actual acceleration, said vehicle system control module controlling the vehicle system in response to the difference.

15. A control module as recited in claim 13 further comprising:
- a difference module determining a difference between the estimated acceleration and the actual acceleration, said vehicle system control module controlling the vehicle system in response to a magnitude of the difference.

16. A control module as recited in claim 13 wherein the possible acceleration module determines the estimated acceleration from at least one of engine torque, engine speed, throttle, gear, torque multiplication of a torque converter, or a tractive effort.

17. A control module as recited in claim 13 further comprising:
- a tire spin module determining tire spin.

18. A control module as recited in claim 13 wherein, in response to the actual acceleration and the estimated acceleration, the vehicle system control module determines that at least one of the actual grade conditions are high, the vehicle is trailering a load, and that the vehicle is carrying a heavy load.

19. A control module as recited in claim 13 wherein the vehicle system control module controls at least one of an engine torque, transmission torque, axle torque, differential torque, propshaft torque, and transfer case torque.

20. A control module as recited in claim 13 wherein the vehicle system control module controls at least one of an engine system, a transmission system, a traction control system, a vehicle stability control system, a handling control system, a shift stabilization system, a cooling control system, or a rear steering control system.

* * * * *